Dec. 9, 1952 R. STEHL 2,620,548
LATHE TURRET
Filed Sept. 12, 1949 3 Sheets-Sheet 1
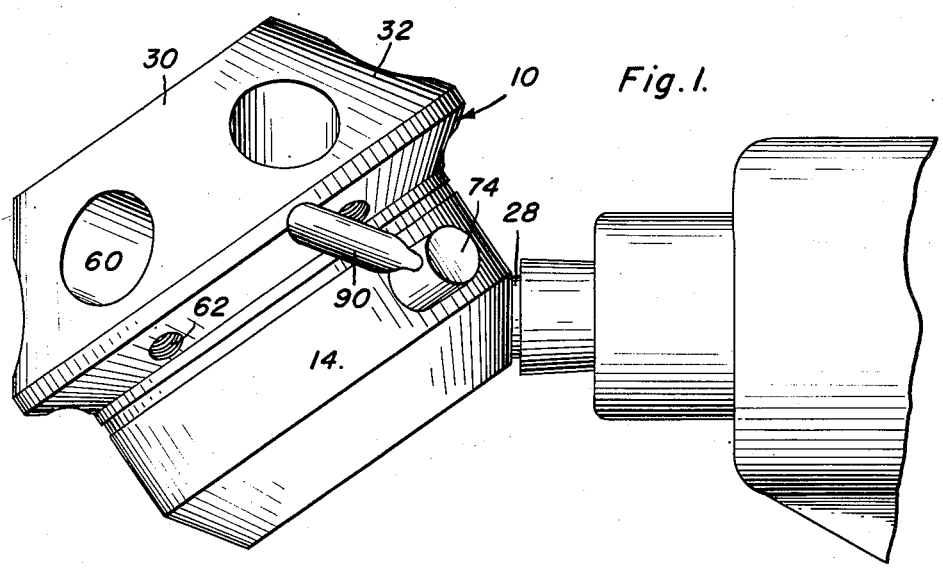
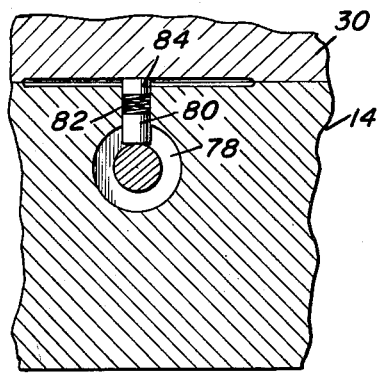
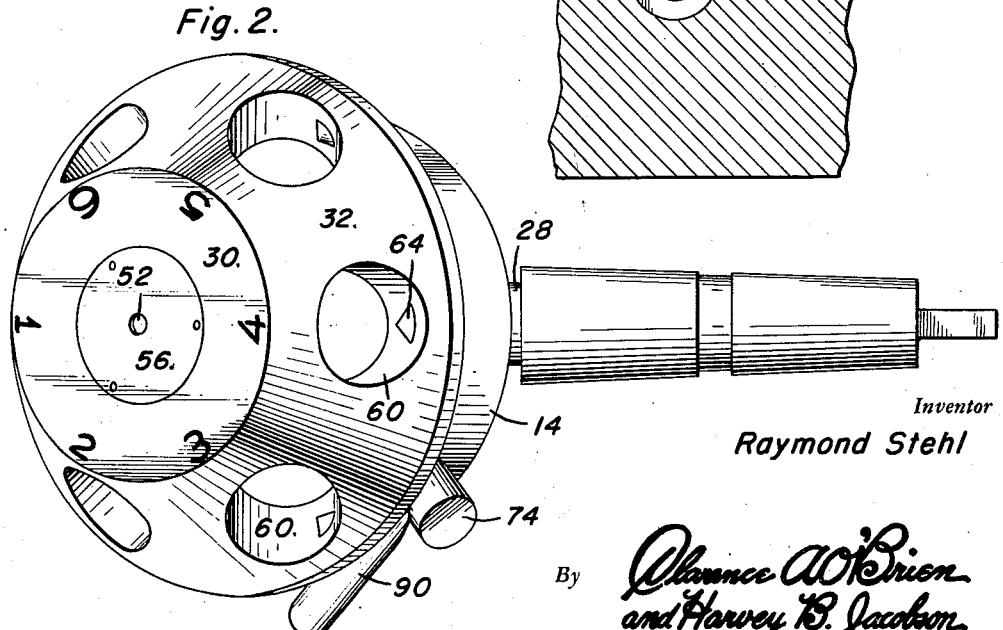
Inventor
Raymond Stehl
By Clarence A. O'Brien
and Harvey B. Jacobson
Attorneys Inventor
Raymond Stehl Dec. 9, 1952 R. STEHL 2,620,548
LATHE TURRET
Filed Sept. 12, 1949 3 Sheets-Sheet 3

Inventor
Raymond Stehl

By Clarence A. O'Brien
and Harvey B. Jackson
Attorneys

Patented Dec. 9, 1952

2,620,548

UNITED STATES PATENT OFFICE 2,620,548

LATHE TURRET

Raymond Stehl, Chicago, Ill.

Application September 12, 1949, Serial No. 115,207

4 Claims. (Cl. 29—48)

1

This invention relates to novel improvements in lathe turrets and more particularly appertains to an improved indexing mechanism for the tool mounted in the turret head.

The primary object of this invention is to rotate the turret head for selectively positioning tools, secured in the tool sockets formed in the head, in longitudinal alignment and in working position with the arbor or spindle and to lock the turret head so that the selected tool is held in such alignment.

Another important object of this invention is to enable various tools, carried by the turret head, to be moved into working position and to be held securely in such position, the entire indexing operation requiring but one movement of an operating shaft.

A meritorious feature of this invention resides in the provision of a base section and head section rotatably mounted thereon, the sections forming the turret, the base section being secured on the lathe arbor and housing the indexing mechanism for aligning the tool sockets formed in the rotatable head with the arbor.

These and ancillary objects and other structural features of merit are attained by this invention, the preferred embodiment of which is set forth in the following description and illustrated in the accompanying drawings, wherein:

Figure 1 is a side elevational view of a lathe turret, constructed in accordance with this invention, the same being shown and operatively mounted on a lathe arbor or spindle;

Figure 2 is a top plan view thereof;

Figure 7 is a fragmentary enlarged sectional view of a portion of the upper section of the base and the lower section of the head, illustrating the means provided for preventing sliding movement of the operating shaft or lever for the indexing mechanism;

Figure 3:
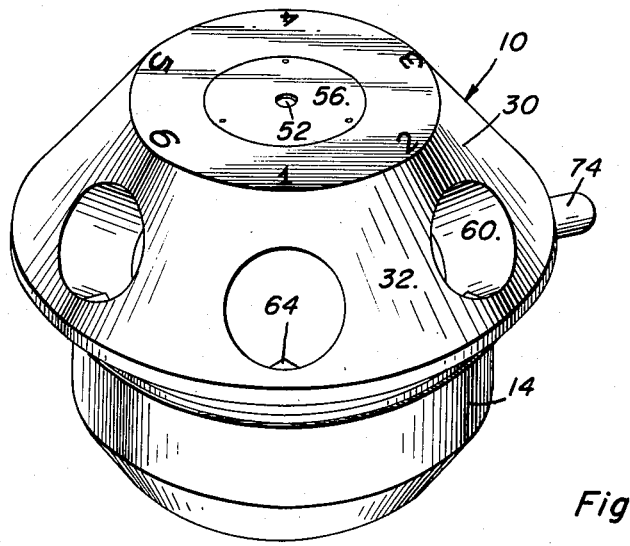
Figure 3 is a side elevational view of the turret.
Figure 5:
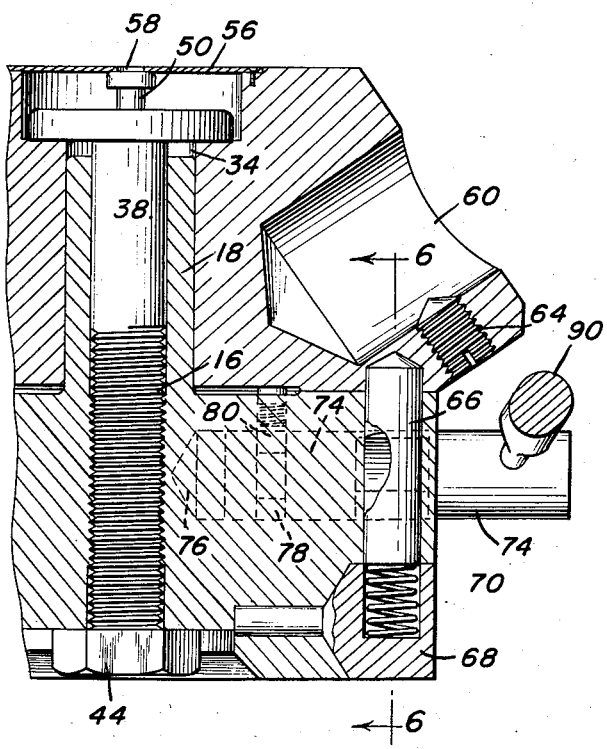
Figure 5 is an enlarged fragmentary vertical sectional view, illustrating the indexing mechanism, which is operatively housed in the base section of the turret.
Figure 6:
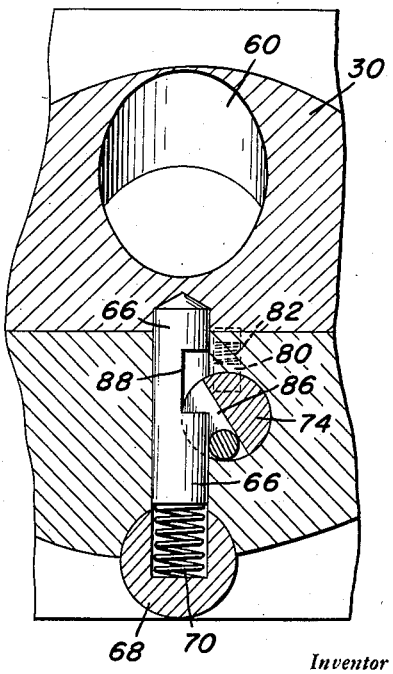
Figure 6 is a fragmentary detailed sectional view taken on line 6—6 of Figure 5.

Referring now more particularly to the accompanying drawings, the lathe turret 10 includes a substantially round base section 14, which is formed with an axially disposed passage 16. An integral sleeve or boss 18 extends upwardly from the top 20 of the base, the bore of the sleeve being in alignment with the passage 16, so that the walls of the passage and the inner walls of the sleeve are continuous. The passage is counter-sunk as at 22 and the outer wall is chamfered as at 24. A bore 26 is formed angularly through the side wall of the base, adjacent the bottom portion thereof, the bore being inclined relative to the axis of the base and being adapted to receive the reduced end of a lathe arbor or spindle 28.

A substantially circular head section 30 is provided and is formed with an outwardly flared skirt 32. The head is drilled and bored axially to form a centrally disposed axial passage 34, within which the sleeve 18 of the base is disposed, the head section rotating about the sleeve and being rotatively disposed on the top 20 of the base. The head is counterbored as at 36 to form a diametrically enlarged outer opening at the outer end of the passage 34.

An exteriorly threaded tie bolt 38 is disposed through the passage 16 in the base and through the sleeve 18, the head 40 of the bolt being seated within the counterbore 36. It is to be noted that the head 40 of the bolt is formed with vertical openings 42, which are provided so that the head may be gripped by a tool and held against rotation, when the nut 44 is secured on the opposing end of the bolt, the nut being received within the counterbore 22 in the base.

An opening 46 is centrally disposed longitudinally in the head end of the tie bolt and a spring 48 is disposed in the opening to resiliently mount a stud 50, which is formed with a flat head 52. In this respect, an annular groove 54 is formed around the counterbore 36 to receive an oil cap or cover plate 56, the latter being formed with a center vertical opening 58. It is to be noted that the upper face of the head 52 of the stud is in alignment with the center opening 58 of the plate and closes off the opening. Thus, chips and dirt are prevented from entering the passage in the head and are prevented from entering the counterbore to interfere with the free rotation of the head on the base. For oiling purposes, however, the center opening in the plate and the resiliently urged stud closing off the opening, are provided. Thus, oil may be introduced into the counterbore passage in the head and into the annular space 59, formed between the head and base concentric with the sleeve 18.

A plurality of circumferentially spaced tool sockets 60 are formed through the skirt 32 of the head, the tool sockets being inclined upwardly and outwardly from the axial passage in the head. Internally threaded bores 62 are formed through the lower portion or underside of the skirt 32 and are transversely communicated with the sockets 60, set screws 64 being threadingly disposed in the threaded bores 62 for locking the shanks of the tools within the tool sockets.

Figures 4, 8, 9:
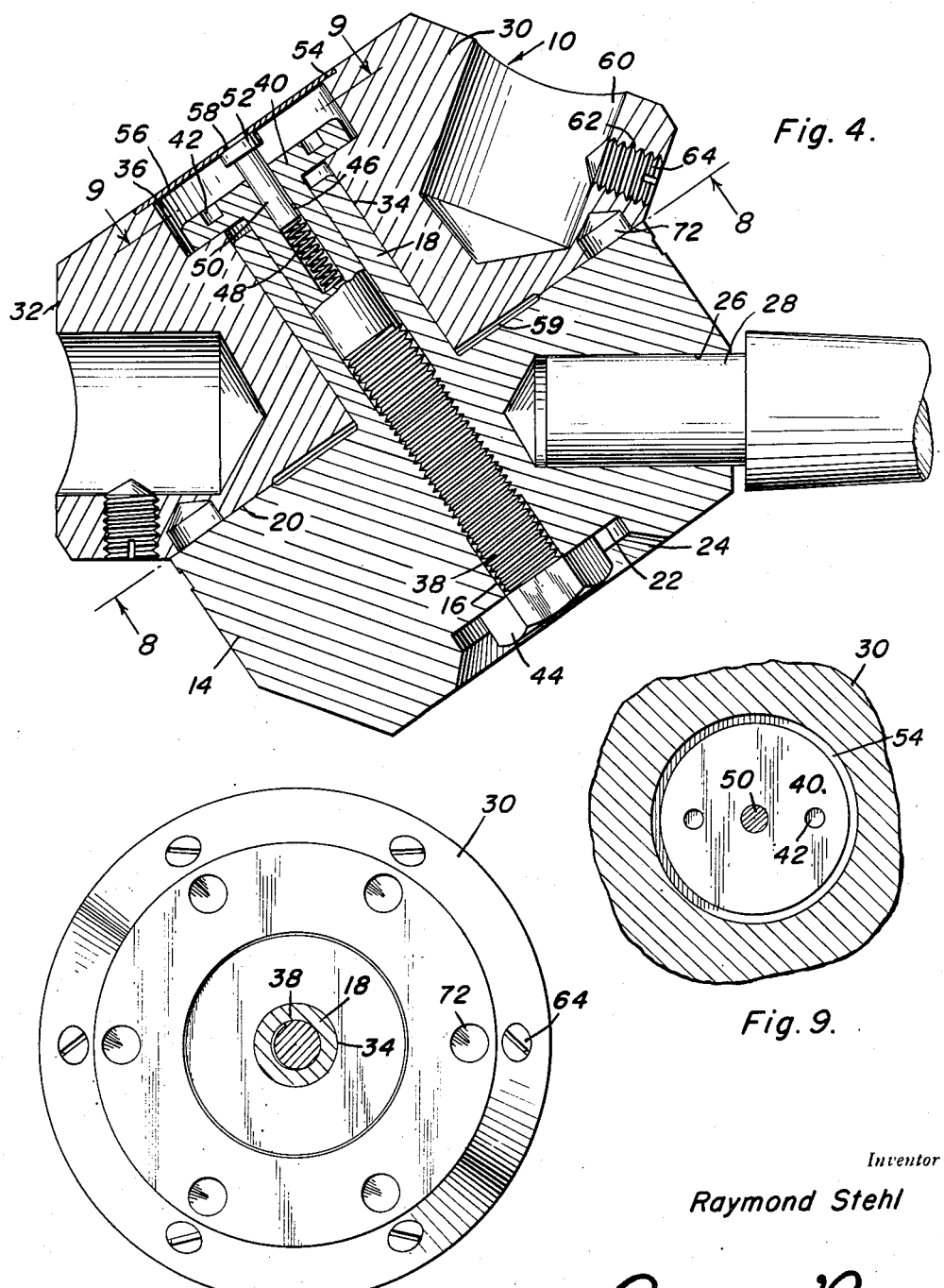
Figure 4 is a longitudinal vertical sectional view.
Figure 8 is a transverse sectional view, taken on line 8—8 of Figure 4.
Figure 9 is a fragmentary transverse sectional view taken on line 9—9 of Figure 4.

It can be seen that the turret head is rotatively mounted on the base and that the base is adapted to be secured to the lathe arbor. A plurality of various tools can be carried by the turret head and it is the primary purpose and aim of this invention to selectively align the tools with the arbor shank, as illustrated in Figure 4, wherein one of the tool sockets 60 is illustrated in longitudinal alignment with the arbor 28. The tool sockets may be axially aligned with the arbor shank by merely rotating the head on the base. However, an indexing and locking mechanism must be provided and this includes a locking pin or indexing pin 66 which is mounted in the base in substantial parallelism with the threaded shank of the tie rod 38. A spring seat 68 is formed in the lower portion of the base and is adapted to house a coiled spring 70, upon which the base of the pin 66 is seated. The spring 70 functions to bias or urge the locking pin upwardly in the base section relative to vertical openings 72 formed in the bottom of the head. The openings 72 are circumferentially spaced and are formed in vertical alignment with the sockets, the openings 72 being parallel with the axial passage 34 formed in the head. Means is provided for moving the pin 66 out of engagement in the openings 72 and includes a shaft 74 which is transversely disposed in the base and laterally extends through the side wall thereof, the shaft being rotatably journaled in a transverse opening 76 formed in the base at right angles to the axial passage 16. An annular groove 78 is formed on the shaft, adjacent to the inner end and a pin 80 is received in the groove 78 to bear against the shank of the shaft. The pin is mounted in an opening 82 formed through the top of the base and is provided with a top section 84, a spring 85 being interposed between the top section and the pin proper and functioning to retain the pin seated within the groove.

The pin 80 prevents the shaft from sliding transversely in the base but, of course, does not interfere with the rotary movement of the shaft. Adjacent to the center of the shaft, a flat cut-out portion 86 is formed, the same being complementary to and engageable with a rectangular opening 88, which is formed longitudinally in the side wall of the locking pin 66. It is to be noted that the pin 66 cannot rotate, inasmuch as the pin is held within the cut-out portion 86 of the shaft 74. However, rotation imparted to the shaft 74 is translated into vertically sliding movement of the pin 66 by means of the complementary interengaging cut-out portions or slots formed in the shaft and pin respectively. For rotating the shaft 74, a lever or handle 90 is fixed in the outer end of the shaft and projects laterally therefrom.

It can thus be seen that the desired tool in the tool socket is locked, by means of the locking pin 66 being received within the opening 72, which is vertically aligned with the locked tool socket. However, to bring the next tool into proper working position, it is only necessary to move the lever 90 and thereby rotate the shaft 74 and move the locking pin out of engagement in the opening 72. Thereupon, the head is rotated on the base, until the desired tool is axially aligned with the lathe arbor. The spring 70 then urges the locking pin into engagement of the opening 72, which is aligned with the socket retaining the desired tool. Of course, by holding the lever 90 down, the locking pin 66 is held in a lowered position and the head may be rotated to cause the sockets to pass over the pin, without the pin being urged into the socket.

It can thus be seen that a novelly and simply constructed turret head is provided, the turret head being rotatively mounted on a base, within which is operatively disposed an indexing or locking mechanism for selectively locking the head in various positions in order to bring one of the tool sockets formed in the head into longitudinal alignment with the bore 26 in the base and the arbor shank 28 secured within the bore.

Of course, inasmuch as the foregoing represents but one embodiment of this invention, it is to be understood that various changes may be resorted to, the same coming within the purview of the appended claims.

Having thus described this invention, what I desire to claim is:

1. A lathe turret comprising a base section and a head section rotatably mounted on the base section, means for preventing axial separation of the base and head sections, said base section having a bore therein angularly inclined to the axis of rotation of the head section, said head section having spaced angularly disposed tool sockets selectively rotatable into alignment with the bore in the base section, locking means for releasably preventing rotation of the head section and for selectively retaining one of the sockets in alignment with the bore, actuating means for the locking means including a shaft journaled for rotation in the base section and extending laterally therefrom, and releasable means carried by the base section and held in operative engagement with the shaft by engagement with the contiguous face of the head section for preventing longitudinal movement of the shaft.

2. A lathe turret comprising a base section and a head section rotatably mounted on the base section, means for preventing axial separation of the base and head sections, said base section having a bore therein angularly inclined to the axis of rotation of the head section, said head section having spaced angularly disposed tool sockets selectively rotatable into alignment with the bore in the base section, locking means for releasably preventing rotation of the head section and for selectively retaining one of the sockets in alignment with the bore, actuating means for the locking means including a shaft journaled for rotation in the base section and extending laterally therefrom, and releasable means carried by the base section and biased between the contiguous face of the head section and the shaft for preventing longitudinal movement of the shaft.

3. A lathe turret comprising a base section and a head section rotatably mounted on the base section, means for preventing axial separation of the base and head sections, said base section having a bore therein angularly inclined to the axis of rotation of the head section, said head section having spaced angularly disposed tool sockets selectively rotatable into alignment with the bore in the base section, locking means for releasably preventing rotation of the head section and for selectively retaining one of the sockets in alignment with the bore, actuating means for the locking means including a shaft journaled for rotation in the base section and extending laterally therefrom, and releasable means carried by the base section and biased between the contiguous face of the head section and the shaft for preventing longitudinal movement of the shaft, said last means comprising the shaft having a peripheral groove, said base section having a passage therein opening through the face thereof adjacent the head section, a pin slidable in the passage toward and away from the shaft, and resilient means seated against the contiguous face of the head section urging the pin into the groove in the shaft.

4. A lathe turret comprising a base section and a head section rotatably mounted on the base section, said head section having an axial passage therethrough, said base section having an axially extending boss rotatably received in the passage, the end of the passage remote from the base section being countersunk, a headed fastener disposed in the passage and releasably engaging the base section with the head thereof seated in the countersunk portion of the passage, a cover plate carried by the head section closing off the end of the passage remote from the base section, said cover plate having a central opening for introduction of a lubricant, and spring biased means carried by the fastener normally closing said opening, said base section having a bore therein angularly inclined to the axis of rotation of the head section, said head section having spaced angularly disposed tool sockets selectively rotatable into alignment with the bore in the base section, locking means for releasably preventing rotation of the head section and for selectively retaining one of the sockets in alignment with the bore, actuating means for the locking means including a shaft journaled for rotation in the base section and extending laterally therefrom, and releasable means carried by the base section and held in operative engagement with the shaft by engagement with the contiguous face of the head section for preventing longitudinal movement of the shaft.

RAYMOND STEHL.

REFERENCES CITED

The following references are of record in the file of this patent:

UNITED STATES PATENTS

| Number | Name | Date |
|---|---|---|
| 10,712 | Trott | Mar. 28, 1854 |
| 166,787 | Krutzsch | Aug. 17, 1875 |
| 666,263 | Cox | Jan. 22, 1901 |
| 784,984 | Carson | Mar. 14, 1905 |
| 851,354 | Hockensmith | Apr. 23, 1907 |
| 1,227,486 | Newman et al. | May 22, 1917 |
| 1,737,002 | De Vlieg | Nov. 26, 1929 |

FOREIGN PATENTS

| Number | Country | Date |
|---|---|---|
| 81,161 | Switzerland | May 15, 1919 |